United States Patent [19]

Kuroe

[11] Patent Number: 4,837,080
[45] Date of Patent: Jun. 6, 1989

[54] MAGNETIC RECORDING MEDIUMS FOR HIGH DENSITY RECORDING COMPRISING AN IMPROVED STRUCTURE OF A MAGNETIC LAYER

[75] Inventor: Akio Kuroe, Osaka, Japan
[73] Assignee: Matsushita Electric Industrial Co., Ltd., Japan
[21] Appl. No.: 121,909
[22] Filed: Nov. 17, 1987

[30] Foreign Application Priority Data

Nov. 18, 1986 [JP] Japan .............................. 61-274524
Dec. 16, 1986 [JP] Japan .............................. 61-299502

[51] Int. Cl.$^4$ ................................................ G11B 5/70
[52] U.S. Cl. ................................... 428/323; 427/131; 428/694; 428/695; 428/900
[58] Field of Search ............... 428/694, 900, 695, 323, 428/141; 427/131, 128

[56] References Cited

U.S. PATENT DOCUMENTS

| | | | |
|---|---|---|---|
| 4,410,565 | 10/1983 | Kitamoto et al. | 427/130 |
| 4,414,271 | 11/1983 | Kitamoto et al. | 428/694 |
| 4,447,467 | 5/1984 | Oguchi et al. | 427/48 |
| 4,520,069 | 5/1985 | Kitamoto et al. | 428/694 |
| 4,588,656 | 5/1986 | Kitamoto et al. | 428/694 |
| 4,672,009 | 6/1987 | Takahashi | 428/694 |

Primary Examiner—Paul J. Thibodeau
Attorney, Agent, or Firm—Lowe, Price, LeBlanc, Becker & Shur

[57] ABSTRACT

A magnetic recording medium which comprises a base film having a multitude of fine projections uniformly distributed over one surface thereof, and a magnetic layer formed on the base film. The magnetic layer is made of magnetic acicular particles extending from the individual projections in a vertical direction with respect to the base film, and a resin composition comprising a lubricant. The resin composition fills substantially all gaps formed among the vertically extending magnetic acicular particles. This medium may be formed on another magnetic recording medium for longitudinal recording.

10 Claims, 3 Drawing Sheets

MAGNETIC RECORDING MEDIUMS FOR HIGH DENSITY RECORDING COMPRISING AN IMPROVED STRUCTURE OF A MAGNETIC LAYER

BACKGROUND OF THE INVENTION

1. Field of the Invention

This invention relates to magnetic recording mediums which have an improved structure of a magnetic layer, thereby attaining significantly improved durability and electromagnetic characteristics. The magnetic recording mediums may be magnetic tapes, floppy disks, magnetic cards and the like.

2. Description of the Prior Art

A recent trend in the field of magnetic recording is to record information at a high density. This requires the use of recording signals in a short range of wavelength. For instance, with VHS (video home system) video tape recorders, a minimum wavelength used is only 1.2 micrometers and for videotape recorders using an 8 mm wide tape, a very short wavelength of 0.6 micrometers has been used. In order to cope with these types of video tape recorders, it is usual to use a coating tape such as a tape comprising cobalt-containing iron oxide particles with a surface roughness of about 500 angstroms as a magnetic recording layer, or a metallic tape having a surface roughness of 200 to 300 angstroms. These known tapes employ a longitudinal recording format in which the magnetization resides in the plane of the tape. However, these types of mediums have a limitation on high density recording as is known in the art.

Instead of the longitudinal recording systems, there have been proposed so-called vertical recording systems which enable one to record information using signals of shorter wavelengths. A typical vertical recording medium is one which comprises a base of a resin such as polyamide, polyimide or polyethylene terephthalate, and an alloy film such as a Co-Cr alloy formed on the base by vacuum deposition or sputtering. The vertical recording medium has significantly improved electromagnetic characteristics including an output level, over known longitudinal or in-plane recording mediums when information is recorded using signals having a wavelength of from 0.1 to 0.5 micrometers.

However, the alloy film formed by vacuum evaporation or sputtering is so thin that it is not highly resistant to abrasion or impact force and is inconveniently liable to break upon contact with a magnetic head or guide rolls. To avoid this, a protective or lubricating layer made of fluorine-containing lubricants or high molecular weight fatty acids is formed on the alloy film so as to improve the durability.

Assuming that information is recorded using a relative speed between a magnetic head and a recording medium of 3.75 m/second and a signal of 7.5 MHz, the wavelength is 0.5 micrometers. When a thickness of the lubricating layer is 100 angstroms, the loss of the reproduction signal caused by the spacing between the head and the medium will result in about 1 dB. This eventually places a limit on the thickness of the lubricating layer. When a magnetic head slidingly moves in contact with such a thin lubricating layer many times, the layer is gradually removed by the contact and cannot thus stand repeated use. In other words, the fine defects originally involved in the alloy film will be enlarged and the alloy film will be partially scraped off. As a result, the alloy dust will deposit on the head surface, causing the head to be undesirably covered with the dust. In an extreme case, the head may be broken by contact with the defective alloy film. Even though the alloy film is not broken, it will often be locally creased based on the defects which are produced by the sliding contact between the head and the tape. This brings about a poor contact between the head and the medium, resulting in a considerable lowering of a signal output level.

In order to overcome the above disadvantage, U.S. Pat. Nos. 4,410,565 and 4,414,271 proposed vertical magnetic recording mediums in which a resin is filled in between grains of a ferromagnetic metallic thin film having a cylindrical grain structure. Alternatively, U.S. Pat. Nos. 4,447,467 and 4,672,009 describe vertical magnetic recording mediums in which a magnetic recording layer is not formed by vacuum evaporation or sputtering but is formed by conventional coating techniques, and is subjected to orientation in a magnetic field. However, these known mediums have not necessarily satisfactory durability. Especially, the mediums obtained by the coating techniques are not satisfactory with respect to electromagnetic conversion characteristics.

In general, a vertical magnetic recording medium having a thin alloy recording film exhibits an output level higher by not less than 10 dB than coated metal tapes in a wavelength region for recording of 0.1 to 0.5 micrometers. On the contrary, however, over 1 micrometer, the output level becomes lower than the level of the coated metal tape, with an attendant problem that a sufficiently high signal-to-noise ratio is difficult to obtain.

SUMMARY OF THE INVENTION

It is an object of the invention to provide a vertical magnitude recording medium which has an improved structure in a magnetic recording layer whereby good durability is ensured.

It is another object of the invention to provide a vertical recording medium for high density recording in which a base film and a magnetic layer are strongly combined together with magnetic particles being firmly bonded through a binder.

It is a further object of the invention to provide a vertical magnetic recording medium in which partial or local surface separation of a magnetic layer is suppressed, thereby ensuring further improved durability.

It is yet another object of the invention to provide a magnetic recording system of a double-layered structure which comprises a vertical magnetic recording unit formed on a longitudinal magnetic recording unit whereby signal information over a wide wavelength range can be satisfactorily recorded and reproduced at high output levels.

Broadly, the present invention relates to a vertical magnetic recording medium. This magnetic recording medium comprises a base film having a multitude of fine projections uniformly over one surface thereof, and a magnetic layer formed on the base film. The magnetic layer is comprised of magnetic acicular particles extending from the individual projections in a vertical direction with respect to the base film, and a resin composition comprising a lubricant and filling substantially all gaps or spaces formed among the vertically extending magnetic acicular particles.

The resin composition filled in the gaps or spaces can impart sufficient strength to the magnetic layer. Since the lubricant is contained in the resin composition, the magnetic layer exhibits a good sliding contact with a magnetic head with significantly improved durability.

In accordance with another embodiment of the invention, there is also provided a magnetic recording medium of a double-unit structure which comprises a vertical magnetic recording unit of such a structure as set forth above, and a longitudinal magnetic recording unit which comprises a base film and a magnetic recording layer formed on the base. The vertical magnetic rocording unit is formed on the longitudinal magnetic recording unit to form a system of the double-unit structure. This double-unit structure medium system is also improved in output level in a wide wavelength range for recording.

DETAILED DESCRIPTION AND EMBODIMENTS OF THE INVENTION

Figure 1:
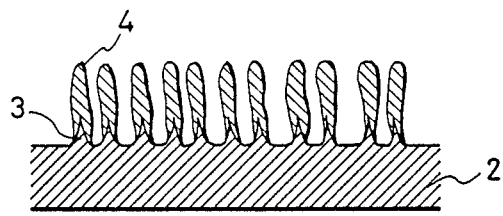
FIG. 1 is a schematic sectional view showing formation of acicular magnetic particles on projections of a sputter-etched base film.

Reference is now made to the accompanying drawings in which like reference numerals indicate like parts or members.

In FIG. 1, there is schematically illustrated formation of acicular magnetic particles on individual projections formed on a base or substrate. In the FIG., a base film is indicated at 2, projections are indicated at 3, acicular magnetic particles are at 4. For the formation of the acicular magnetic particles 4 arranged vertical to the base film 2, the base film is first subjected to sputter-etching in an atmosphere of Ar gas by the use of a so-called RF sputtering apparatus, thereby forming on the film surface a multitude of irregularities having fine projections 3 each having a relatively sharp projecting point as shown. These projections 3 are made as uniformly distributed over one surface of the base film 2. When a desired metal such as Co is sputtered on the projection-bearing surface of the base film 2, acicular magnetic particles 4 are selectively formed on the individual projections as extending from the projections 3 as shown in FIG. 1.

As is known in the art, when a polymer film is sputter-etched, a multitude of irregularities having fine projections are uniformly, densely formed on the sputtered surface. When a metal or alloy is subsequently sputtered over the sputter-etched film, the metal or alloy is selectively deposited at the individual projecting points of the fine projections as shown in FIG. 1, thereby forming acicular particles of the metal or alloy in a direction vertical to the base film.

The distribution and height of the fine projections on a polymer film depends, more or less, on various factors including sputter-etching conditions including an etching time, electric power, a reduced pressure and a pressure of an inert gas such as argon in the etching system, the type of resin used as a film, and the like. The etching time and electric power should be properly determined by repetition of experiments while taking the type of resin film into account.

The pressure in a sputtering system is generally from 1 to $3 \times 10^{-6}$ Torr., and a pressure of an inert gas is generally from 1.5 to $3 \times 10^{-2}$ Torr. In the practice of the invention, it is preferred that sputter-etching conditions are selected to form a multitude of fine projections having a height of not larger than 100 angstroms with a distribution of 10 to 100 projections per square micrometers.

The selective deposition of a metal or metal alloy is effected by ordinary techniques. For instance, a target or targets are sputtered on the etched film under an inner pressure of 0.3 to $50 \times 10^{-7}$ Torr., and a pressure of an inert gas such as argon of from 0.4 to $80 \times 10^{-8}$ Torr. The sputtering time and electric power are, respectively, several tens of minutes to several hours and several tens to several hundreds of watts. These sputtering conditions are not critical, but it is necessary to form magnetic particles selectively on individual fine projections of the etched film as having a length of from about 500 to about 5000 angstroms. These magnetic particles are preferably distributed at 10 to 100 particles per square micrometers, corresponding to the number of the fine projections.

The procedure of forming selectively deposited magnetic particles on a sputter-etched polymer film is described, for example, in "The 47th Study Meeting" of The Applied Magnetic Society of Japan, P. 31 to 39, Sept. 18 and 19, 1986.

Figure 2:
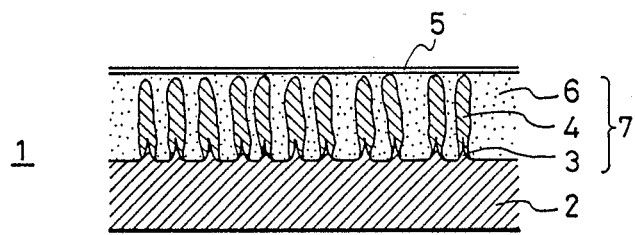
FIG. 2 is a schematic sectional view showing one embodiment of the invention.

FIG. 2 shows one embodiment of a vertical magnetic recording medium, generally indicated at 1, which includes, in addition to the base film 2, fine projections 3 and acicular magnetic particles 4 shown in FIG. 1, a resin composition layer 6. The composition fills, as shown in FIG. 2, the gaps between the acicular magnetic particles 4, thereby forming a magnetic layer 7 including a lubricant surface layer 5 which exudes from the resin composition 6.

Figure 3:
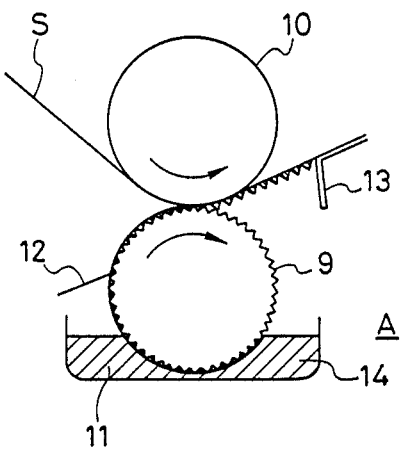
FIG. 3 is a schematic view illustrating an applicator used to make a magnetic recording medium according to the invention.

The resin composition layer 6 is formed by coating, for example, using an apparatus A shown in FIG. 3. The apparatus A includes a gravure roll 9 and a backup roll 10. The gravure roll 9 is partially immersed in a vessel in which a resin paint 14 is contained. The gravure roll 9 has a doctor blade 12 for regulating an amount of the paint 14 on the roll 9. In operation, a sheet S having acicular magnetic particles on the surface as shown in FIG. 1 is passed between the gravure roll 9 and the backup roll 10, which are rotating in directions indicated by the arrows, respectively. After the passage between the rolls 9, 10, the paint on the sheet S is subjected to a doctor blade 13 to give a predetermined thickness of the paint on the sheet S. The applied sheet is subsequently dried and calendered, so that the resultant resin layer is arranged to a height of the acicular magnetic particles, thereby forming the magnetic layer 7. If necessary, the layer 6 may further be heated for curing by suitable means.

The materials for the base film useful in the present invention may be any known resin materials ordinarily used for these purposes and include, for example, polyamide resins, polyimide resins, polyester resins, polyvinyl alcohols resins and the like.

The metals used may be magnetic metals or alloys such as Co, Fe, Ni, Co-Cr alloys, Fe-Co alloys and the like. When sputtered, these metals or alloy are deposited as amorphous in nature.

The resin composition comprises a synthetic or natural resin, and a lubricant. As described above, the resin composition layer is formed to substantially the same level as the acicular magnetic particles extending vertically from the individual projections. The lubricant contained in the composition naturally exudes toward the surface of the magnetic layer as the layer 5 shown in FIG. 2. The synthetic or natural resins used for this purpose may be thermoplastic resins such as polyvinyl chloride, vinyl chloride copolymers, vinyl acetate-/ethylene copolymers, and the like, thermosetting resins such as polyurethanes, epoxy resins, phenolic resins, and the like. The lubricants may be any known compounds including fatty acids, fatty acid esters, silicone oils, fluorine-containing compounds and the like. These resins may be used singly or in combination as desired. In order to permit the lubricant to form a surface layer, it is preferred to use the lubricant in an amount of 2 to 30 parts by weight per 100 parts by weight of the resin used. In practice, the resin composition is applied to the acicular particle-bearing sheet after dissolution in organic solvents including ketones such as methyl ethyl ketone, methyl isobutyl ketone and the like, aromatic compounds such as toluene, xylene, and the like.

Figure 4:
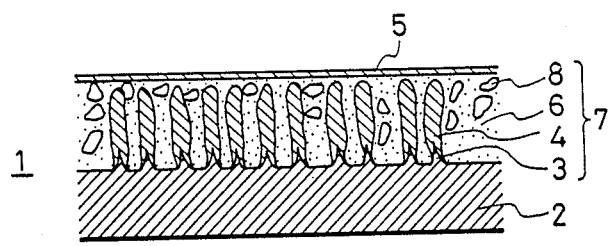
FIG. 4 is a schematic sectional view showing another embodiment of the invention.

FIG. 4 shows another embodiment of a magnetic recording medium which is similar to the medium of FIG. 2 except that fine abrasive particles 8 are uniformly dispersed in the magnetic layer 7. These abrasive particles are useful in preventing the magnetic layer 7 from partial separation by contact with a magnetic head or guide pins. Examples of the abrasive materials include aluminum oxide, titanium oxide, chromium oxide, iron oxide, silicon oxide, and the like. There particles are generally used in an amount of 5 to 40 parts by weight per 100 parts by weight of the resin.

Figure 5:
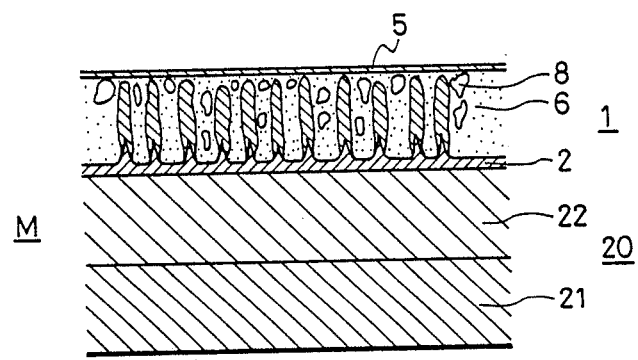
FIG. 5 is a schematic sectional view showing a further embodiment of the invention.

FIG. 5 shows a further embodiment of the invention which illustrates a magnetic recording medium M of the two-unit structure. One of the units has such a structure as described with reference to FIGS. 2 and 4. In FIG. 5, the medium of FIG. 4 is shown in which the abrasive particles 8 are used. In this embodiment, the unit 1 is formed on another unit 20 such that the base film 2 is in contact with the unit 20. The unit 20 has a base film 21 and a magnetic layer 22 of a coating type adapted for use in longitudinal recording. The magnetic layer 22 may be made of any magnetic compositions well known in the art. Typical examples of such magnetic composition include dispersions of particles of magnetic metals or alloys such as Fe, Fe-Ni and the like, or metal oxides such as gamma-$Fe_2O_3$ in various thermoplastic or thermosetting resins such as vinyl chloride resins, vinyl acetate resins, polyurethanes, epoxy resins and the like.

For the fabrication of the two-unit medium system, the unit 20 is first made by a usual manner, after which the resin film 2 is formed on the unit 20. Subsequently, the procedure of making the vertical magnetic recording medium 1, which has been described with reference to FIGS. 1 to 3, is repeated, thereby making the medium M. This type of medium system is very advantageous in providing a good output characteristic over a wide frequency range.

The present invention is more particularly described by way of examples.

EXAMPLE 1

A polyamide film having a thickness of 12 micrometers was subjected to sputter etching by the use of a RF sputtering apparatus under a reduced pressure of $2\times10^{-6}$ Torr., and a pressure of Ar gas of $2\times10^{-2}$ Torr. As a result, the film surface was etched with fine projections. The etched film was subsequently subjected to sputtering of Co under a pressure of $4\times10^{-7}$ Torr., and a pressure of Ar gas of $5\times10^{-3}$ Torr., thereby forming acicular magnetic particles extending from the individual fine projections as shown in FIG. 1. The acicular particles had a length of about 0.5 micrometers. This film was provided as sample A.

The acicular particle-bearing film was then coated with a paint of a resin composition by means of a gravure coater as shown in FIG. 3, in a dry thickness of 1 micrometer from the polyamide base film. Thereafter, the film was passed through calender rolls heated to 60° to 70° C. to press the coated resin to a height of the acicular magnetic particles. For curing, the thus calendered film was allowed to stand in an electric furnance at 70° C. for 24 hours.

The coating paint used above had the following composition in which the respective ingredients were used in amounts indicated below per 100 parts by weight of the acicular magnetic particles formed on the polyamide film.

| Composition: | |
| --- | --- |
| Polyurethane | 10 parts by weight |
| Polyvinyl chloride | 10 |
| Stearic acid | 1 |
| Butyl stearate | 0.5 |

In this manner, a vertical magnetic recording medium as shown in FIG. 2 was fabricated and provided as sample B.

For comparisoin, a known vertical magnetic recording medium was fabricated by forming a Co-Cr alloy layer on a polyamide base film by sputtering and then a layer of a lubricating fluorine compound on the alloy layer. This sample was provided as sample C.

These tape samples were repeatedly subjected to recording and reproducing operations of a signal of 5 MHz by the use of a video tape recorder whose relative speed between a magnetic head and the tape was 3.75 m/second. During the recording and reproducing operations, a variation of the signal level was observed by a spectrum analyzer. In this observation test, the tape used has a length of 20 meters and the magnetic head was a ferrite video head.

Figure 6:
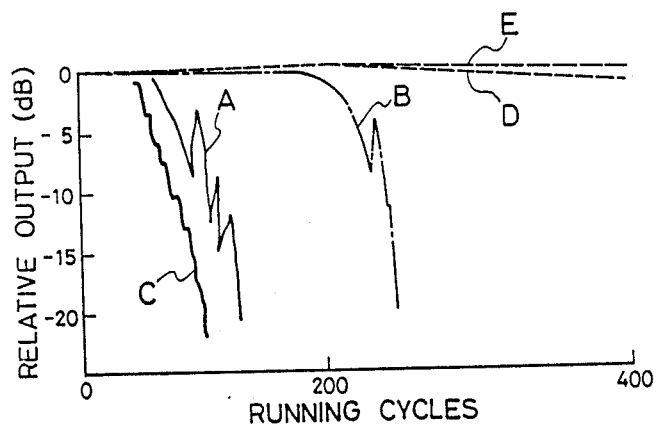
FIG. 6 is a characteristic graph illustrating durability of magnetic recording mediums of the invention.

The results are shown in FIG. 6 in which curve A is for sample A for reference, curve B is for sample B of the invention, and curve C is for sample C for reference. As will be apparent from the figure, sample A which is free of the resin composition lowers in reproduction output level at the 50th running cycle. Over the 100th running cycle, the output level decreases by 10 to 20 dB. The visual observation reveals that the magnetic layer suffers damages over the 100th cycle and is not suitable for practical applications.

Sample C of the known medium also lowers in the output level abruptly at about the 40th cycle and is thus unsuitable for practical applications.

On the contrary, sample B of the invention will be found to be significantly improved in durability over the samples A and C. This is because acicular magnetic particles of sample B vertically fixed on the base film are reinforced with the organic resins. In addition, the stearic acid and butyl stearate used as lubricants allow smooth contact with the magnetic head, thereby significantly improving the durability. The tape of sample B can stand use of 200 running cycles, which is within a range of service life.

EXAMPLE 2

The general procedure of fabricating sample B of Example 1 was repeated except that fine particles of $Al_2O_3$ were added in an amount of 5 parts by weight, thereby obtaining tape sample D. This sample was subjected to the performance teste in the same manner as in Example 1.

The results are shown in FIG. 6 as curve D, revealing that a stable output level can be obtained over the 400th operation cycle without deposition of the dust from the magnetic layer on the magnetic head. This is because the fine particles of $Al_2O_3$ prevent the magnetic layer from being removed or scraped off by means of the magnetic head. Aside from $Al_2O_3$, other hard abrasive particles such as $Cr_2O_3$, alpha-$Fe_2O_3$, $SiO_2$ and the like exhibit similar effects.

EXAMPLE 3

A polyethylene terephthalate film was coated with a magnetic paint comprising an Fe-Ni alloy powder dispersed in a polyvinyl chloride resin in a thickness of 3 micrometers and dried by a usual manner to obtain a longitudinal magnetic recording unit. A 0.5 micrometer thick polyamide film was subsequently laminated on the magnetic layer of the unit. Thereafter, the procedure of Example 2 was repeated using the abrasive particles, thereby forming a vertical magnetic recording unit on the longitudinal magnetic recording unit. In this manner, the medium system of the type as shown in FIG. 5 was fabricated and provided as sample E.

This sample E was subjected to the durability test in the same manner as in Example 1. The results are shown in FIG. 6 as curve E, revealing that the durability is remarkably improved similar to the durability of sample D.

EXAMPLE 4

An electromagnetic characteristic was determined in this example, in which a gap length of a ferrite head was 0.23 micrometers and a relative speed between the head and a tape was 3.75 m/sec to measure a reproduction output frequency characteristic. The tapes used were samples A and E obtained in the foregoing examples. Also, the Fe-Ni alloy metallic tape obtained as one of the units was provided as sample F, and sample C of the known Co-Cr vertical magnetic recording tape was used.

Figure 7:
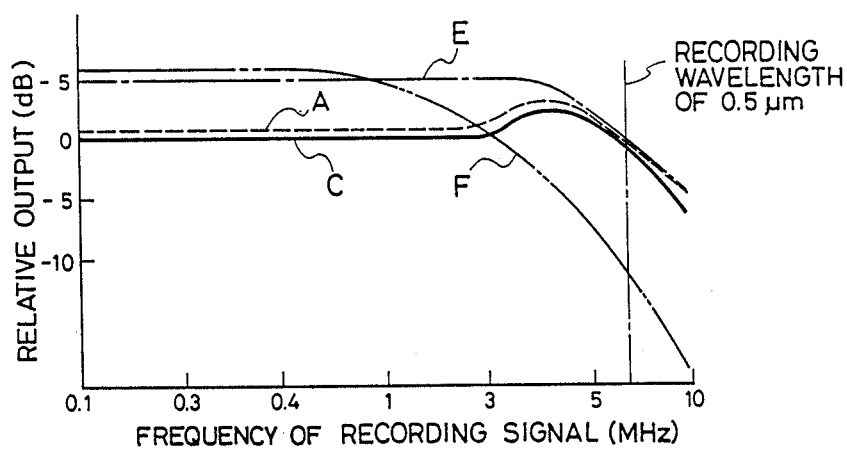
FIG. 7 is a characteristic curve illustrating the relation between a relative output level and a frequency of recording signal.

The relation between the relative output level and the frequency of a recording signal for these samples is shown in FIG. 7. The curves A, C, E and F, respectively, correspond to the samples A, C, E and F.

As will be seen from the FIG., the Co-Cr vertical magnetic recording tape sample C is better by not less than 10 dB than the coated metallic tape sample F in a high frequency resin or in a short wave region. However, in a low frequency region, the sample A is lower by about 5 dB than the sample F, with the signal-to-noise ration being not satisfactory. The sample A of the invention has a similar tendency as the sample C and has thus a low output level in a low frequency region.

Figure 8:
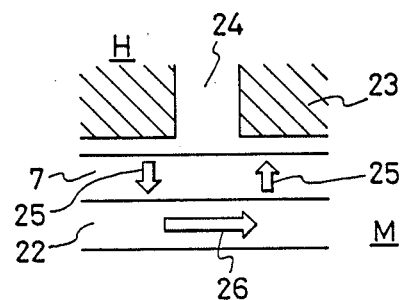
FIG. 8 is a schematic sectional view illustrating the principle of the magnetic recording medium shown in FIG. 5.

On the other hand, the sample E of the invention has an improved output level by about 5 dB in the low frequency region and has also such a good output level as the Co-Cr vertical magnetic recording tape in the high frequency region. The reason for this is schematically illustrated with reference to FIG. 8. In the FIG., a magnetic head H is shown, which includes a pair of head cores 23. A double-unit medium M in the vicinity of the head H is magnetized, by a magnetic field of a semi-circular form generated from a head gap between the head cores 23, vertically as 25 in the vertical magnetic layer and longitudinally as 26 in the in-place magnetic layer 22. Presumably, this is the reason why a high recording and reproducing efficiency is obtained over a wide frequency range.

What is claimed is:

1. A magnetic recording medium which comprises a base film having a multitude of fine projections uniformly distributed over one surface thereof, and a magnetic layer formed on the base film, the magnetic layer comprising magnetic acicular particles having a length of from 500 to 5000 angstroms and extending from the individual projections in a vertical direction with respect to the base film, and a resin composition comprising a lubricant and filling substantially all gaps formed among the vertically extending magnetic acicular particles.

2. A magnetic recording medium according to claim 1, wherein said projections have a distribution of from 10 to 100 projections/square micrometers.

3. A magnetic recording medium according to claim 1, wherein said projections are formed by sputter etching of the base film.

4. A magnetic recording medium according to claim 1, wherein said resin composition comprises the lubricant in an amount of from 2 to 30 parts by weight per 100 parts by weight of a resin in the composition.

5. A magnetic recording medium according to claim 1, further comprising abrasive particles in said resin composition.

6. A magnetic recording medium according to claim 5, wherein said abrasive particles are used in an amount of from 5 to 40 parts by weight per 100 parts by weight of the resin composition.

7. A magnetic recording medium according to claim 1, further comprising a lubricant layer on said magnetic layer, said lubricant having been exuded from the resin composition.

8. A magnetic recording medium comprising a first vertical magnetic recording unit which comprises a base film having a multitude of fine projections uniformly distributed over one surface thereof, and a magnetic layer formed on the base film, the magnetic layer comprising magnetic acicular particles having a length of from 500 to 5000 angstroms and extending from the individual projections in a vertical direction with respect to the base film, and a resin composition comprising a lubricant and filling substantially all gaps formed among the vertically extending magnetic acicular particles, and a second longitudinal magnetic recording unit comprising a substrate film and a magnetic layer which is magnetizable in a longitudinal or inplane direction of the magnetic layer and is formed on the substrate film, said first unit being superposed on said second unit so that the base film of said first unit is in face-to-face relation to the magnetic layer of said second unit.

9. A magnetic recording medium according to claim 8, wherein said magnetic layer of said second unit is made of an Fe-Ni alloy.

10. A magnetic recording medium according to claim 8, wherein said magnetic layer of said first unit comprises abrasive particles.

* * * * *